United States Patent
Bunn, Sr.

(10) Patent No.: US 11,131,409 B2
(45) Date of Patent: *Sep. 28, 2021

(54) SNAP TOGETHER PIPE COUPLING ASSEMBLY

(71) Applicant: Keith R. Bunn, Sr., Grand Rapids, MI (US)

(72) Inventor: Keith R. Bunn, Sr., Grand Rapids, MI (US)

(73) Assignee: Keith R. Bunn, Sr., Grand Rapids, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/034,386

(22) Filed: Sep. 28, 2020

(65) Prior Publication Data

US 2021/0010623 A1 Jan. 14, 2021

Related U.S. Application Data

(63) Continuation of application No. 16/299,745, filed on Mar. 12, 2019, now Pat. No. 10,801,652.

(51) Int. Cl.
*F16L 21/04* (2006.01)
*F16L 21/00* (2006.01)
*F16L 21/08* (2006.01)

(52) U.S. Cl.
CPC .............. *F16L 21/04* (2013.01); *F16L 21/002* (2013.01); *F16L 21/007* (2013.01); *F16L 21/08* (2013.01)

(58) Field of Classification Search
CPC ....... F16L 21/04; F16L 21/002; F16L 21/007; F16L 21/06

USPC .......................... 285/308, 314, 321–324, 337
See application file for complete search history.

(56) References Cited

U.S. PATENT DOCUMENTS

| | | | |
|---|---|---|---|
| 4,169,967 A | 10/1979 | Bachle | |
| 4,573,716 A | 3/1986 | Guest | |
| 4,632,437 A * | 12/1986 | Robson | F16L 37/101 285/243 |
| 6,349,978 B1 | 2/2002 | McFarland et al. | |
| 9,551,447 B2 | 1/2017 | Guest | |
| 10,801,652 B2 | 10/2020 | Bunn | |
| 2003/0122372 A1 | 7/2003 | Muto | |
| 2003/0201642 A1* | 10/2003 | Guest | F16L 37/0925 285/308 |
| 2006/0202478 A1* | 9/2006 | Guest | F16L 19/086 285/322 |
| 2020/0292110 A1 | 9/2020 | Bunn | |

* cited by examiner

*Primary Examiner* — Matthew Troutman
*Assistant Examiner* — Fannie C Kee
(74) *Attorney, Agent, or Firm* — Warner Norcross + Judd LLP

(57) ABSTRACT

A pipe system for transporting liquid. The pipe system connects adjacent pipes and includes a pipe having a coupler cup formed in an end thereof. The coupler cup is configured for receiving and end of a second pipe therein. The pipe system includes a coupler cap adapted to snap onto the coupler cup. The coupler cap also has an opening for receiving the second pipe therethrough to couple the first pipe and the second pipe. A seal is disposed between the coupler cap and the coupler cup to provide a sealed pipe system.

19 Claims, 11 Drawing Sheets

SNAP TOGETHER PIPE COUPLING ASSEMBLY

The present disclosure relates to a pipe coupling assembly for addressing issues related to leakage between coupled pipes in a simple, easy to use manner.

Transporting liquid from one location to another through a pipe system typically requires coupling multiple pipes together. Each point of coupling is a potential source of leakage for the liquid being transported through the pipe system. For example, transporting liquid from a residential or commercial sink to a drain typically includes a drain system formed from multiple pipes coupled together. Addressing leaks in the drain system is a common problem encountered in the plumbing field. Consumers will often try to repair leaks on their own without the aid of a professional plumber, however, the results are often not satisfactory and leaks will re-occur. Even professional plumbers can encounter difficulties in addressing some coupling leaks. For example, a drain trap can account for up to 80% of the leaks in an under-sink drain system.

SUMMARY

In some embodiments, the present disclosure relates to a pipe system for transporting liquid. The pipe system sealingly connects adjacent pipes and includes a pipe with a coupler cup formed in one end thereof. The coupler cup is configured to receive an end of a second pipe therein. The pipe system includes a coupler cap adapted to snap onto the coupler cup. The coupler cap also has an opening to receive the second pipe therethrough to couple the first pipe and the second pipe. A seal is disposed between the coupler cap and the coupler cup to provide a sealed pipe system.

In another embodiment, a pipe coupling assembly includes a coupler cup, a release ring, and a coupler cap adapted to be snapped onto the coupler cup. The coupler cup has a main body portion including an exterior surface and an interior surface defining an interior of the coupler cup. The coupler cup also includes a first engagement surface, an upper rim defining an opening into the interior of the coupler cup, and an angled surface on the exterior surface of the main body portion. The angled surface extends between the upper rim and the first engagement surface. The release ring, which has an exterior surface including an angled surface, is disposed around the exterior of the coupler cup. The coupler cap includes a first side and a second side connected by an annular sidewall having an interior surface and an exterior surface. The coupler cap includes a second engagement surface and an angled surface on the interior surface of the sidewall, and the angled surface extends between the second side thereof and the second engagement surface. The coupler cap further includes a plurality of flex tabs defined by a plurality of spaced slots in the sidewall and which extend from the second side of the coupler cap. The second engagement surface of the coupler cap is adapted to engage the first engagement surface of the coupler cup when the coupler cap is snapped onto the coupler cup. The flex tabs flex outwardly as the angled surface of the coupler cap slides along the angled surface of the coupler cup, until the second engagement surface engages the first engagement surface, and the coupler cap is snapped onto the coupler cup.

According to another embodiment, a pipe system for a pressure tight connection of adjacent pipes includes first and second pipes. The first pipe has a first end portion and the second pipe has a coupler cup formed in a second end portion thereof. The coupler cup is adapted to receive the first end portion of the first pipe therein. The coupler cup includes a main body portion, an upper rim, a first engagement surface, and an angled surface. The main body portion has an interior surface which defines an interior of the coupler cup, and the first engagement surface and angled surface are disposed on an exterior surface of the coupler cup. The upper rim defines an opening through which the first end portion of the first pipe is inserted into the coupler cup. The coupler cap is configured to sealingly couple the first pipe and the second pipe. The coupler cap includes a second engagement surface and an angled surface on an interior surface thereof, a plurality of flex tabs, and a cinch collar. The cinch collar defines an opening through which the first end portion of the first pipe is inserted and is adapted to engage the first pipe. The second engagement surface is adapted to engage the first engagement surface when the coupler cap is snapped onto the coupler cup. When snapping the coupler cap onto the coupler cup, the flex tabs flex outwardly as the angled surface of the coupler cap slides along the angled surface of the coupler cup until the second engagement surface engages the first engagement surface of the coupler cup.

In another embodiment, a bonding sleeve is disposed between the cinch collar and the first pipe, and a pinch ring is disposed around the cinch collar to bond the coupler cap to the first pipe.

In other embodiments, the interior surface of the coupler cap includes at least one annual groove therein for increasing the flexibility of the flex tabs.

In still other embodiments, a gasket sleeve includes a rim sealing surface and at least one body sealing surface. The rim sealing surface surrounds the upper rim of the coupler cup and is adapted to form a liquid-tight seal. The body sealing surface(s) is/are disposed in the interior of the coupler cup and is/are adapted to form a liquid-tight seal. The coupler cap is adapted to engage and compress the rim sealing surface when the coupler cap is snapped onto the coupler cup. The compressed rim sealing surface and the body sealing surface(s) provide at least two liquid-tight seals around an end portion of a pipe inserted into the coupler cup.

The aforementioned pipe system and pipe coupling assembly provide a plumbing solution that saves time, reduces cost, and reduces the risk of installation error and potential leaks. The pipe coupling assembly enables adjacent pipes to be connected without the need for special tools, glue, or solder. Because the coupler cap is configured to snap onto the coupler cup, installation is fast and the risk of error is decreased, which decreases the potential outcome of plumbing leaks. Additionally, the coupling assembly includes its own removal tool, which remains with the coupling assembly after installation. This ensures that the removal tool does not get lost and is always available when, and right where, the user wishes to disconnect the pipes.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Referring to FIGS. 1-5, the numeral 10 generally designates a pipe system 10. Pipe system 10 can include a variety of pipes, such as a drain pipe, a T-shaped pipe, a liquid trap, and a cross-over pipe, coupled together to transport liquid. In the illustrated embodiment, pipe system 10 includes two straight pipes 22, 24 for transporting liquid, which are coupled by a pipe coupling assembly 20 described herein. As will be more fully described below, pipe coupling assembly 20 is configured to provide a snap fit coupled between the two pipe sections to provide a quick and easy way to join the two pipes together, and further with a sealing system that seals the pipes in the pipe coupling assembly 20. It will be understood that pipe coupling assembly 20 can be used to couple adjacent pipes in any liquid transporting pipe system. Pipe coupling assembly 20 can be used alone in a liquid transporting pipe system or in combination with other types of coupling assemblies. Further, the components of pipe system 10 and pipe coupling assembly 20 can be made from any suitable material or combination of materials, non-limiting examples of which include metal and polymeric materials.

Figure 1:
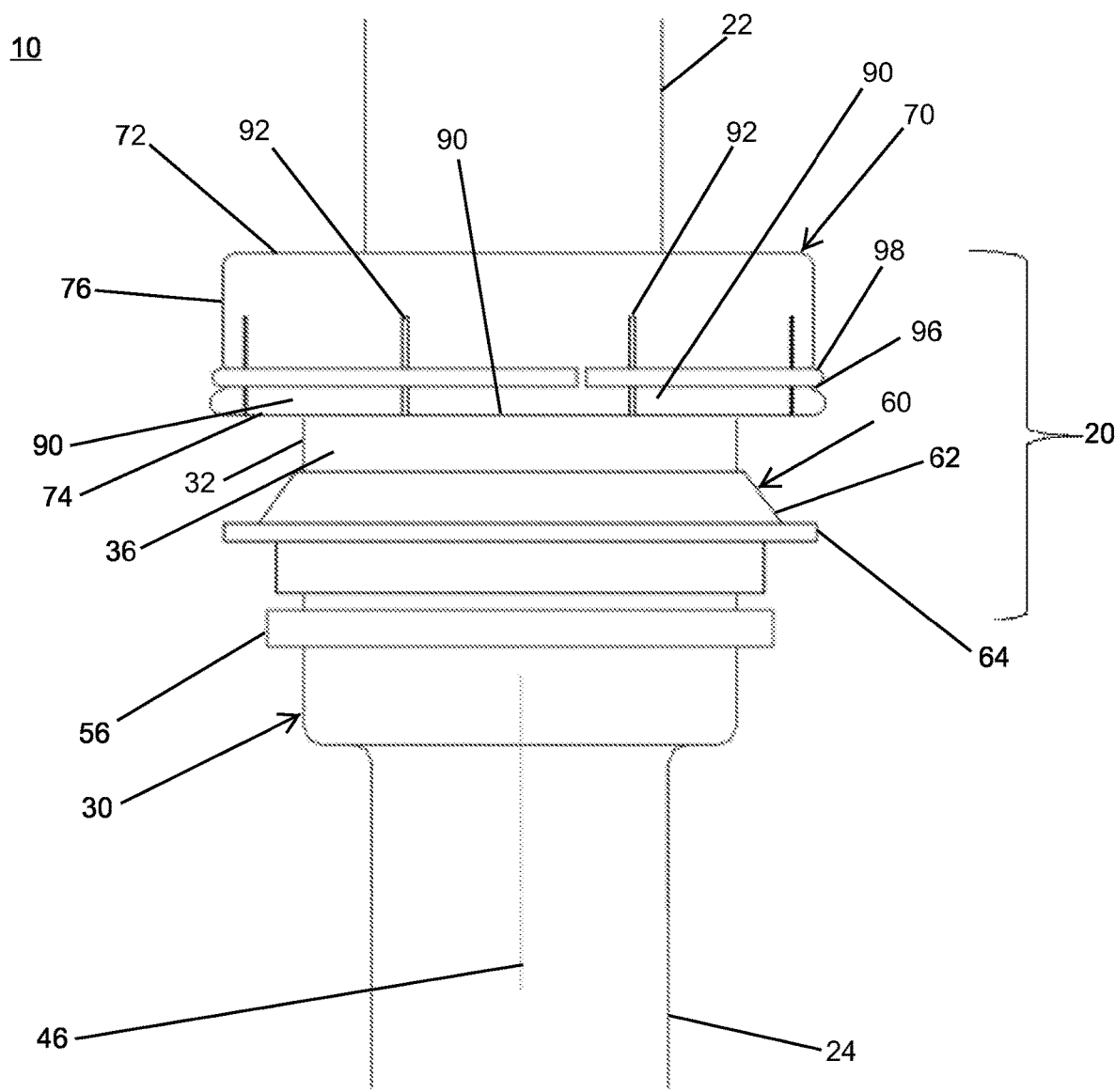
FIG. 1 is a side view of a pipe system and pipe coupling assembly according to an embodiment of the invention.
Figure 2:
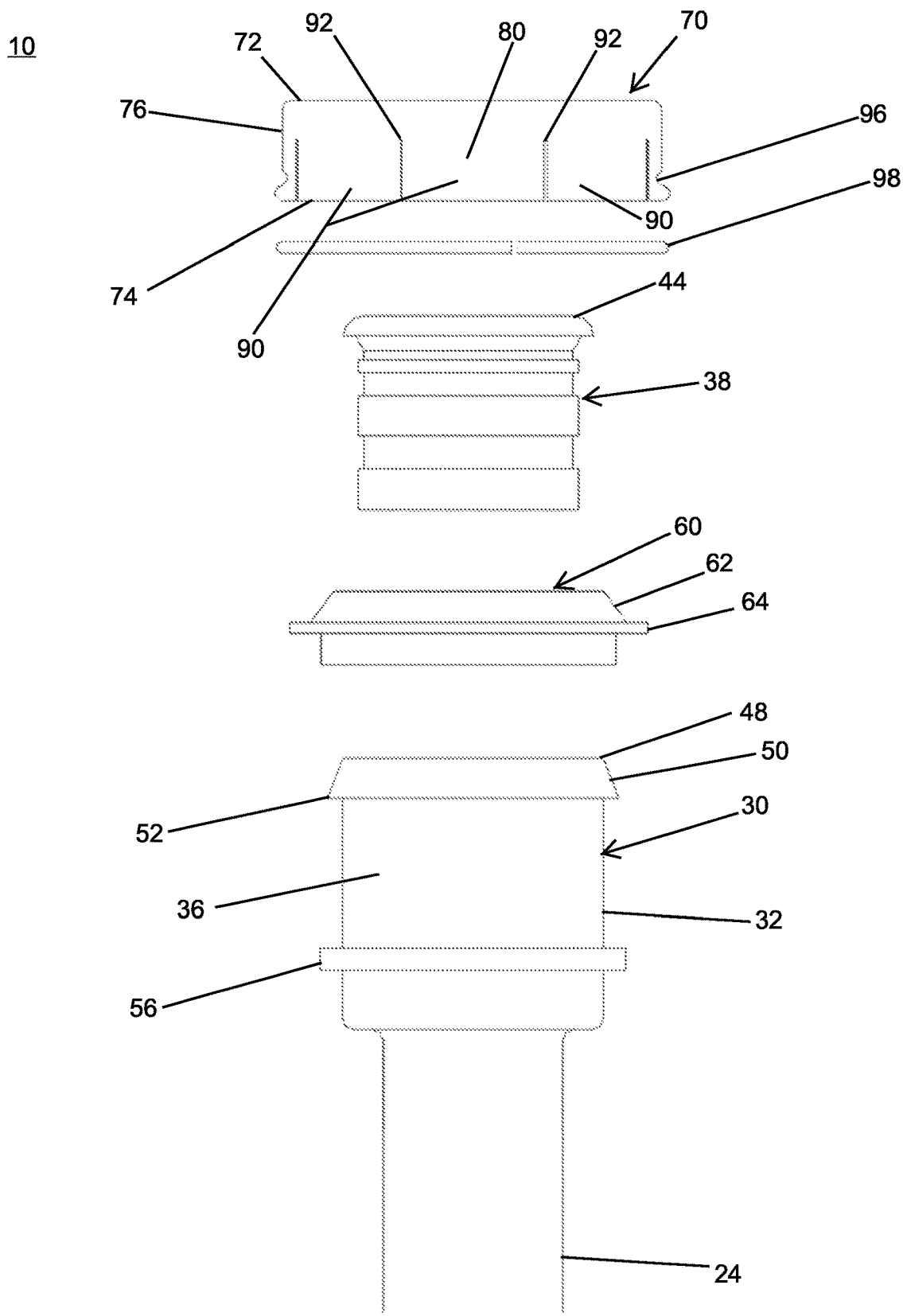
FIG. 2 is an exploded view of the pipe coupling assembly of FIG. 1.
Figure 3:
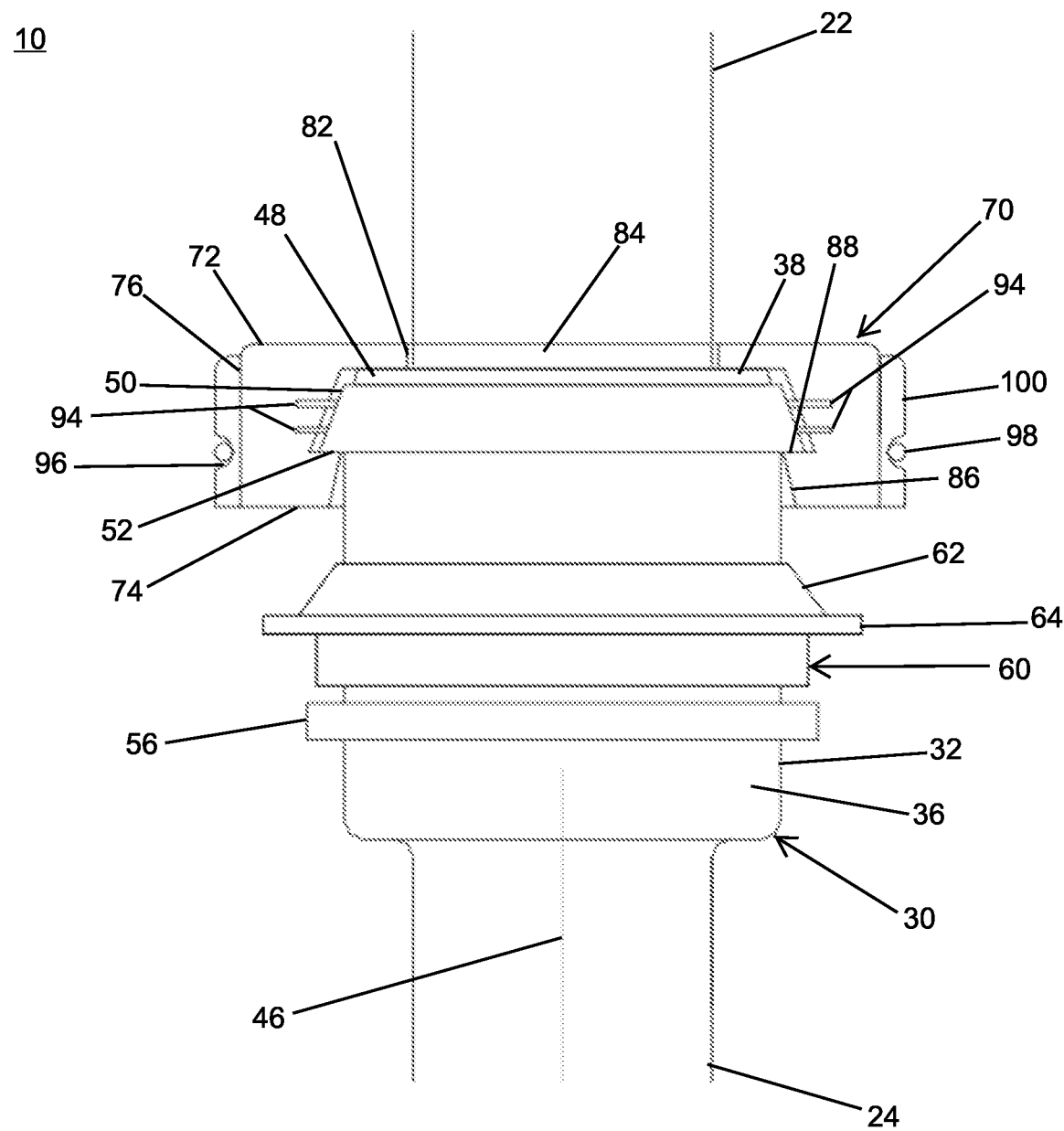
FIG. 3 is a side view of the pipe coupling assembly of FIG. 1, with a coupler cap shown in cross-section.

Referring now to FIG. 2, coupling assembly 20 includes a coupler cup 30 that is formed in or at an end portion of a second pipe 24 for coupling to an end portion of an adjacent first pipe 22. Coupler cup 30 includes a main body 32 having an interior surface 34, defining the interior of the coupler cup 30, and an exterior surface 36. An upper rim 48 of the coupler cup 30 defines an opening into the interior of the coupler cup 30 into which an end portion of first pipe 22 can be inserted. The coupler cup 30 includes a first engagement surface 52, which may be formed from a lip, and an angled surface 50, which forms a cam surface, each disposed on the exterior surface 36 of the main body 32. The angled surface 50 is angled relative to a longitudinal axis 46 of the coupler cup 30 and extends between the upper rim 48 and the first engagement surface 52. The coupler cup 30 also includes a gasket rim 54 adjacent upper rim 48, with the gasket rim 54 surface being angled inward toward the interior of the coupler cup 30. It should be understood that the term "cup" is used broadly and refers to any receptacle structure for receiving another pipe. It should also be understood that the term "lip" is also broadly used to include, for example, a projection, a shoulder, a tab, a ledge, a shelf, or the like, or multiples thereof. Therefore, the lip can be continuous or formed from one or more discrete elements.

Figure 4:
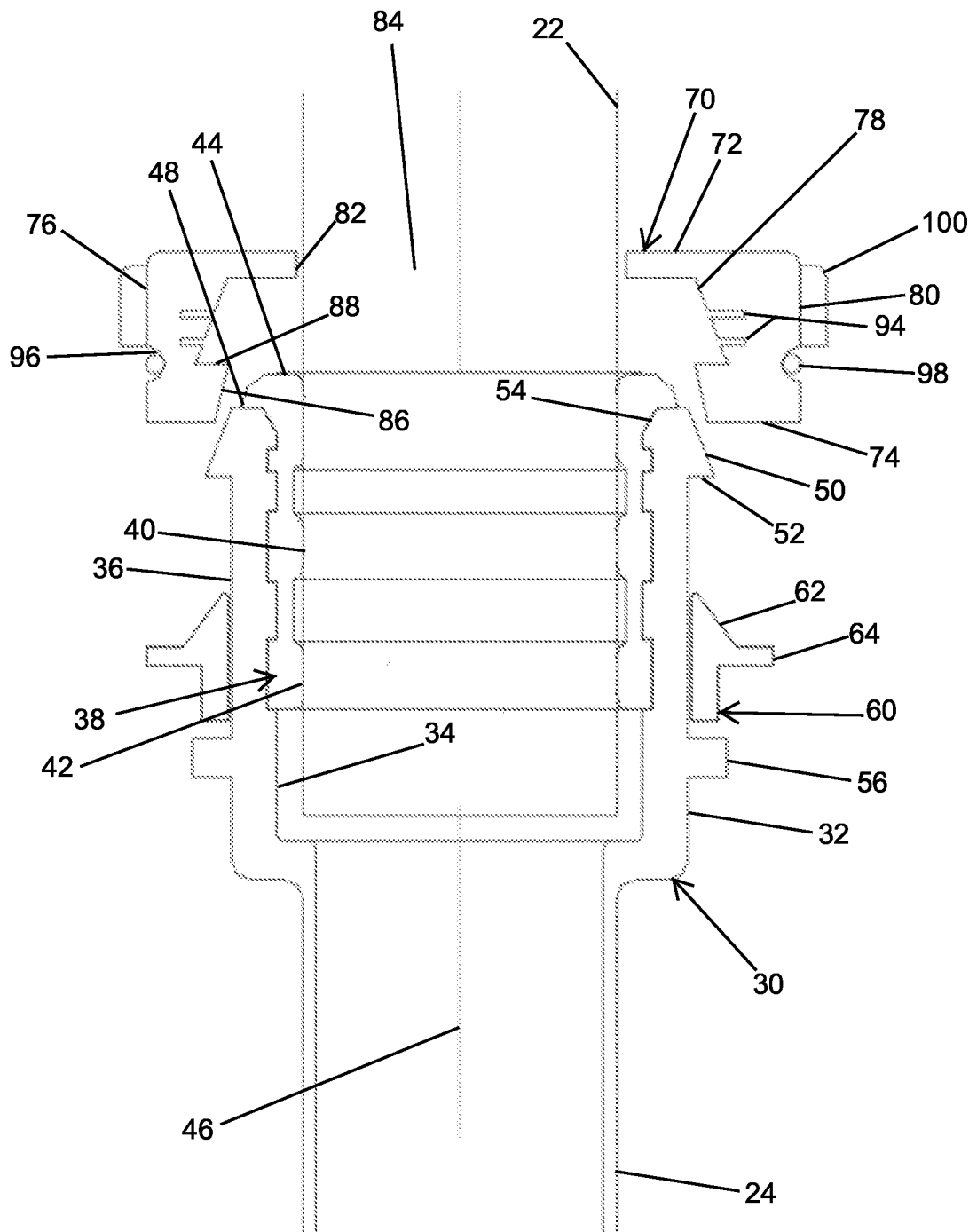
FIG. 4 is a cross-sectional side view of the pipe coupling assembly of FIG. 1, illustrating a pre-snapped-together configuration.
Figure 5:
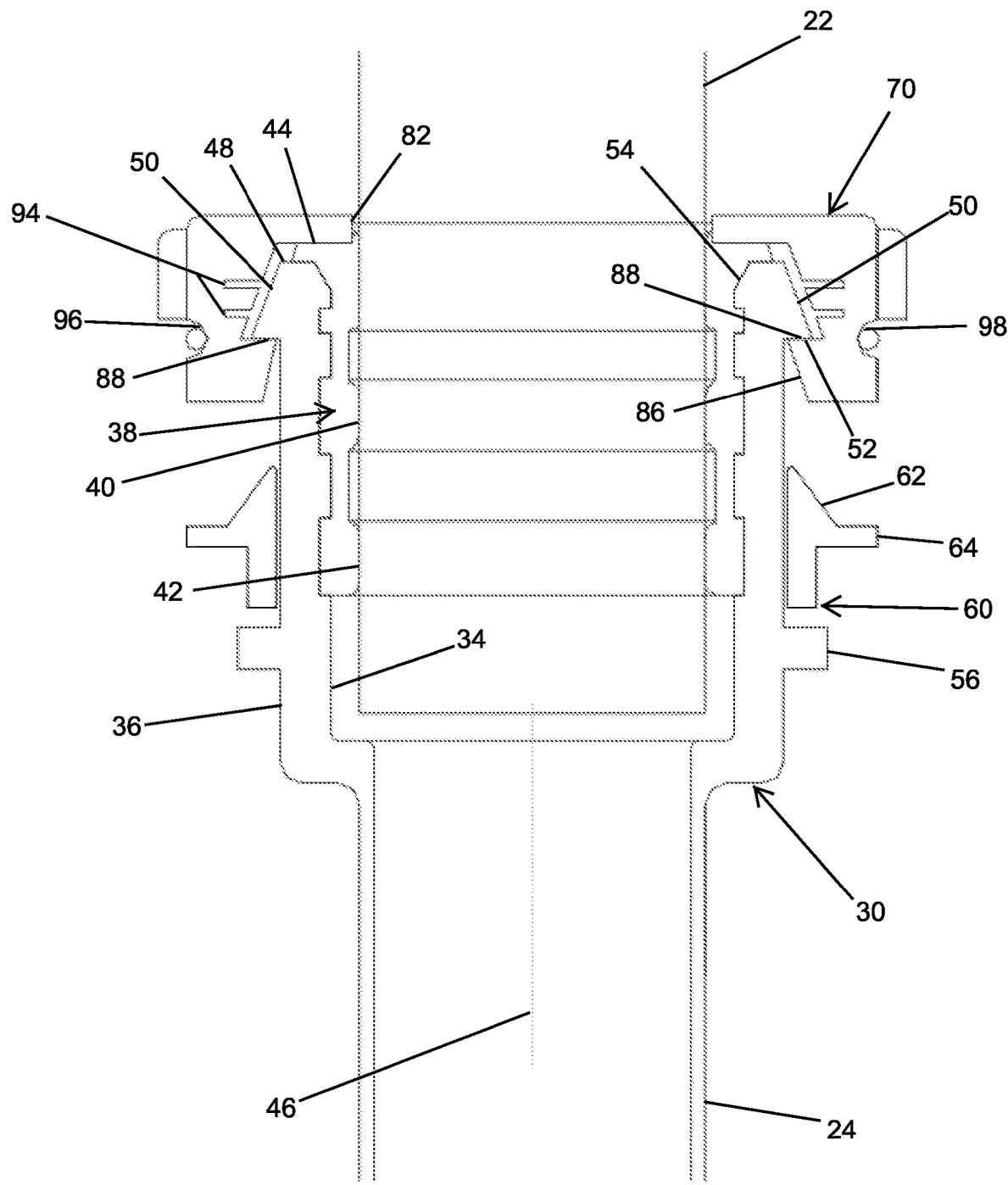
FIG. 5 is a cross-sectional side view of the pipe coupling assembly of FIG. 1, illustrating a snapped-together configuration.

Referring now to FIGS. 4 and 5, a gasket sleeve 38 is disposed on the interior surface 34 of the coupler cup 30. Gasket sleeve 38 includes a body sealing surface 40 on an interior surface of gasket sleeve 38. The gasket sleeve 38 may include two or more body sealing surfaces 40, 42 that are spaced along the longitudinal axis 46 of the coupler cup 30. While gasket sleeve 38 is illustrated with two sealing surfaces 40, 42, it is within the scope of the invention for gasket sleeve 38 to include additional sealing surfaces arranged parallel with, but spaced from, body sealing surfaces 40, 42. A rim sealing surface 44 is provided on upper rim 48 for forming a liquid-tight seal between the gasket sleeve 38 and inserted first pipe 22. Upper rim 48 includes the angled surface gasket rim 54 that is angled inward to the interior of the coupler cup 30 to support rim sealing surface 44.

Body sealing surfaces 40, 42 and rim sealing surface 44, together form pipe coupling sealing surfaces. Thus, body sealing surfaces 40, 42 form first and second lines of defense against leaks, and the rim sealing surface 44 provides a third line of defense against leaks. In addition, body sealing surfaces 40, 42 hold the inserted pipe parallel to the coupler cup 30, as well as absorb shock due to bumps or impacts without losing the water tight seal.

In one example, the gasket sleeve 38 is a molded gasket, such as an injection molded silicone gasket. The interior surface 34 of coupler cup 30 can optionally be provided with grooves adapted to support each of the body sealing surfaces 40, 42 of the gasket sleeve 38. The body sealing surfaces 40, 42 and rim sealing surface 44 can optionally be bonded with the adjacent surface using an adhesive or a melt weld. The molded gasket sleeve 38 is optionally embedded within a recess formed in the corresponding supporting part. For example, coupler cup 30 can be made from a suitable polymeric material, such as polyvinylchloride, through an injection molding process, and the gasket sleeve 38 is formed during a separate injection molding process to bond the body sealing surfaces 40, 42, and 44 to the adjacent surfaces of coupler cup 30 (or snapped into place as noted). Silicone is selected as an exemplary material for the sealing surfaces 40, 42, and 44 due at least in part to its elastomeric and stress relaxation characteristics. Silicone-based materials can also be relatively resistant to heat compared to other elastomers and can generally provide acceptable or better sealing pressure when used with the coupling assembly 20.

Referring to FIGS. 2-5, the pipe coupling assembly 20 also includes a coupler cap 70 adapted to be mounted to, for example, snapped onto, the coupler cup 30. The coupler cap 70 includes a first side 72, a second side 74, and a body portion annular sidewall 76 extending between first and second sides 72, 74. The coupler cap 70 and sidewall 76 define an interior surface 78 and an exterior surface 80. First side 72 includes a flange 82 that extends inward toward a center of the coupler cap 70. Second side 74 is configured to receive coupler cup 30 to allow coupler cap 70 to be placed over and mounted to the end of coupler cup 30. Flange 82 defines an opening 84 in the first side 72 of coupler cap 70 that is dimensioned so as to allow the end portion of first pipe 22 to be inserted through coupler cap 70 and into the coupler cup 30.

The coupler cap 70 includes a second engagement surface 88 and an angled surface 86 on the interior surface 78 of the sidewall 76. The angled surface 86 extends between the second side 74 and the second engagement surface 88. The coupler cap 70 also includes a plurality of flex tabs 90 defined by a plurality of slots 92 in the sidewall 76 and spaced about a circumference of coupler cap 70. The slots 92 extend up from the second side 74 of the coupler cap 70. The interior surface 78 of the sidewall 76 includes at least one relief groove 94. The relief grooves 94 extends into the sidewall 76 and is perpendicular to the longitudinal axis 46. The relief grooves 94 may be continuous or discontinuous about the inner circumference of the coupler cap 70. The illustrated example includes two spaced relief grooves 94 that are continuous about the circumference. Of course, more or fewer grooves could be provided, and the grooves could be discontinuous. The relief grooves 94 provide flexibility to the sidewall 76, and flex tabs 90, as described in greater detail below. It should be understood that more or fewer slots 92 and flex tabs 90 could be provided around the coupler cap 70 to provide flexibility as desired.

The coupler cap 70 includes an annular groove 96 on the exterior surface 80 thereof. The groove 96 extends around the circumference of the coupler cap 70 and is shown to have a substantially semi-circular cross-section. It should be understood that other cross-sectional shapes are contemplated, including square and triangular. A retaining ring 98 is positioned in the groove 96 to retain the coupler cap 70 to the coupler cup 30. The retaining ring 98 can be made of spring steel. Spring steel is selected as an exemplary material due at least in part to its high yield strength. Spring steel allows objects to return to their original shape despite significant deflection or twisting. The retaining ring 98 is split such that it is capable of being twisted and/or expanded enough to be installed around the exterior of the coupler cap 70 and placed into the groove 96.

Figure 9:
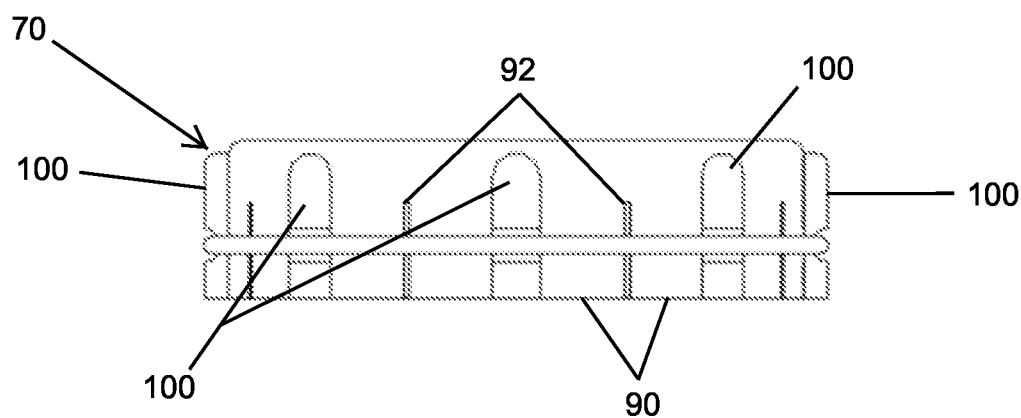
FIG. 9 is a side view of a coupler cap of the pipe coupling assembly according to an embodiment of the invention.
Figure 10:
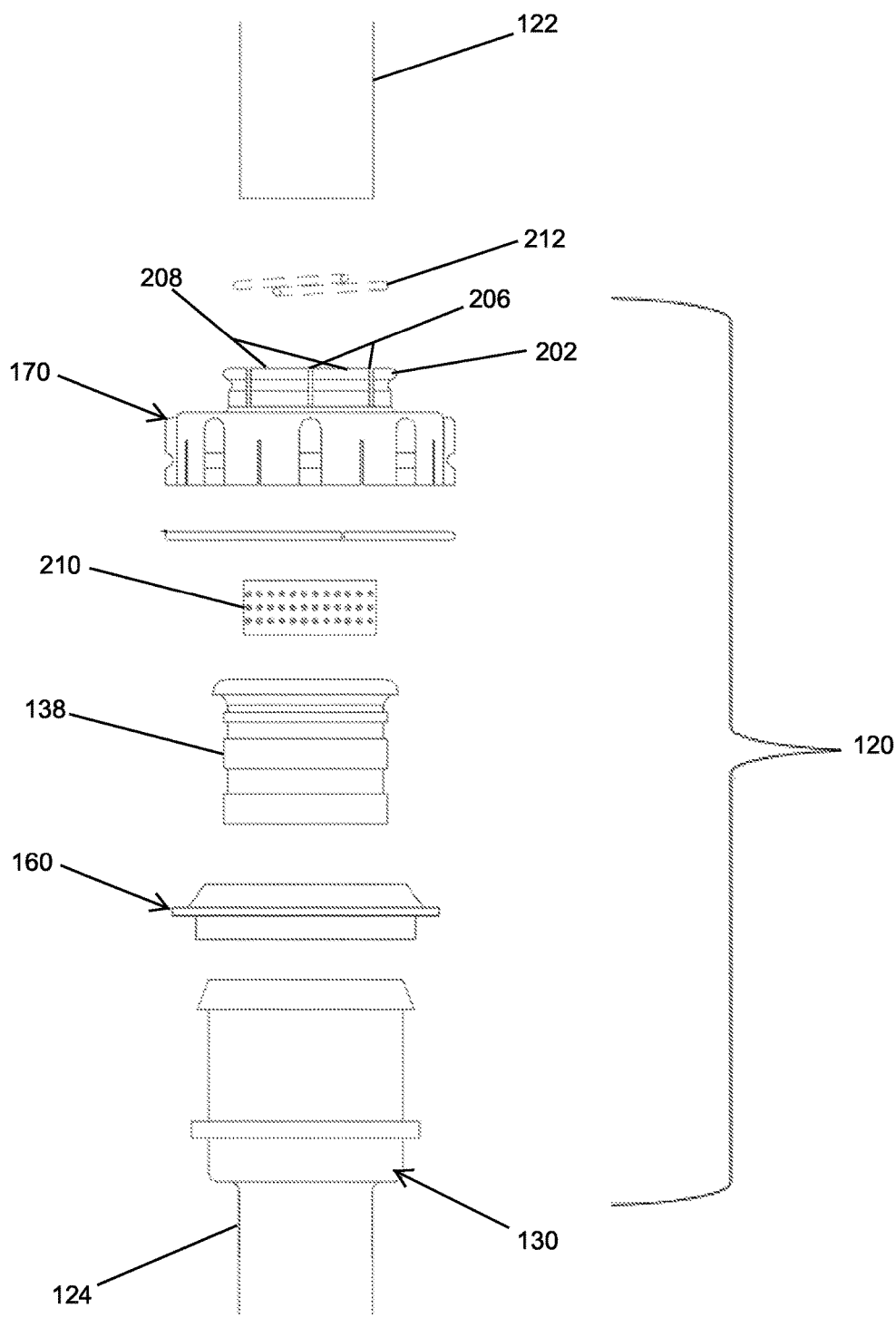
FIG. 10 is an exploded view of a pipe system and pipe coupling assembly according to an embodiment of the invention.
Figure 11:
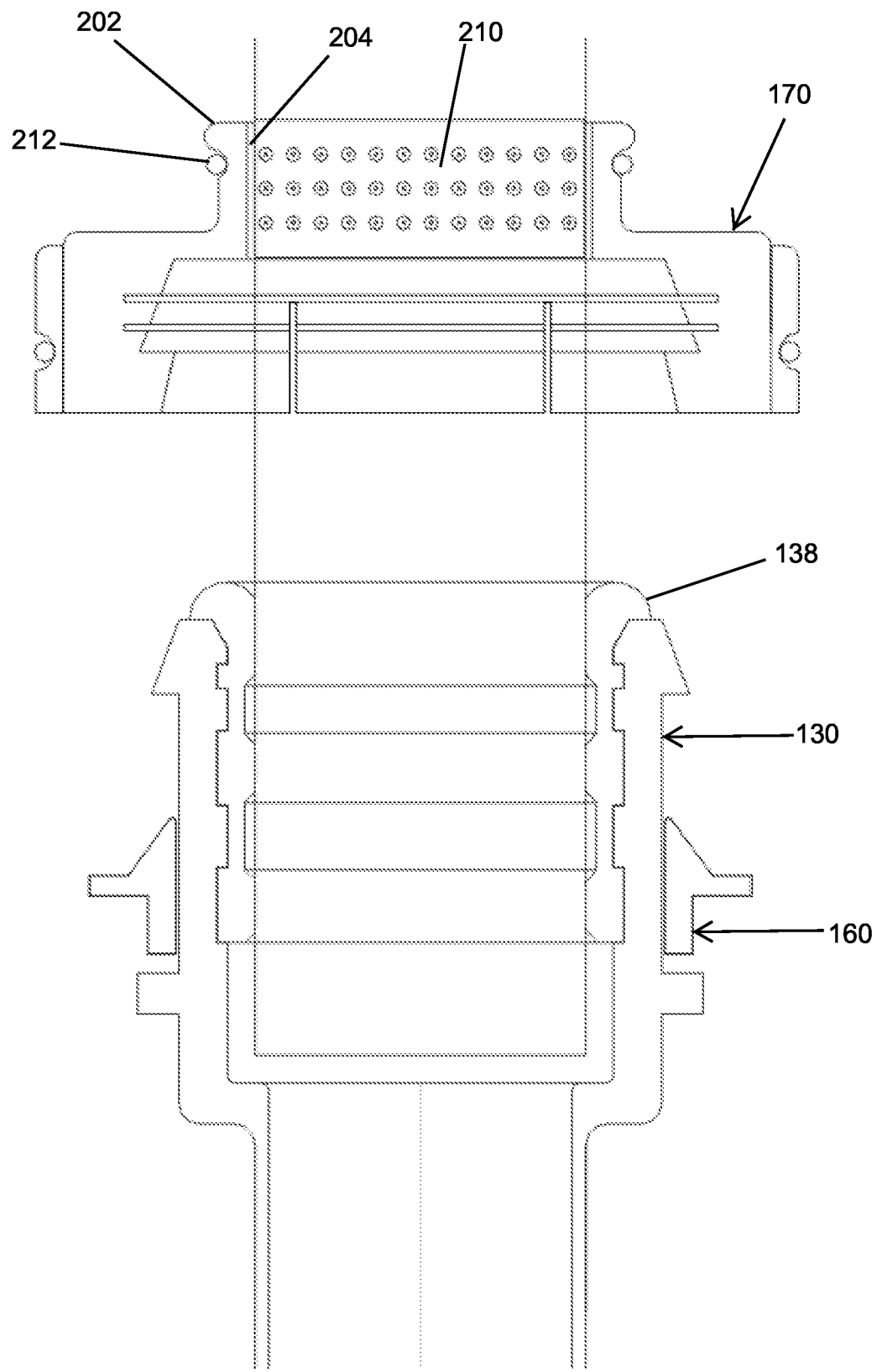
FIG. 11 is a cross-sectional side view of the pipe coupling assembly of FIG. 10, illustrating a pre-snapped-together configuration.
Figure 12:
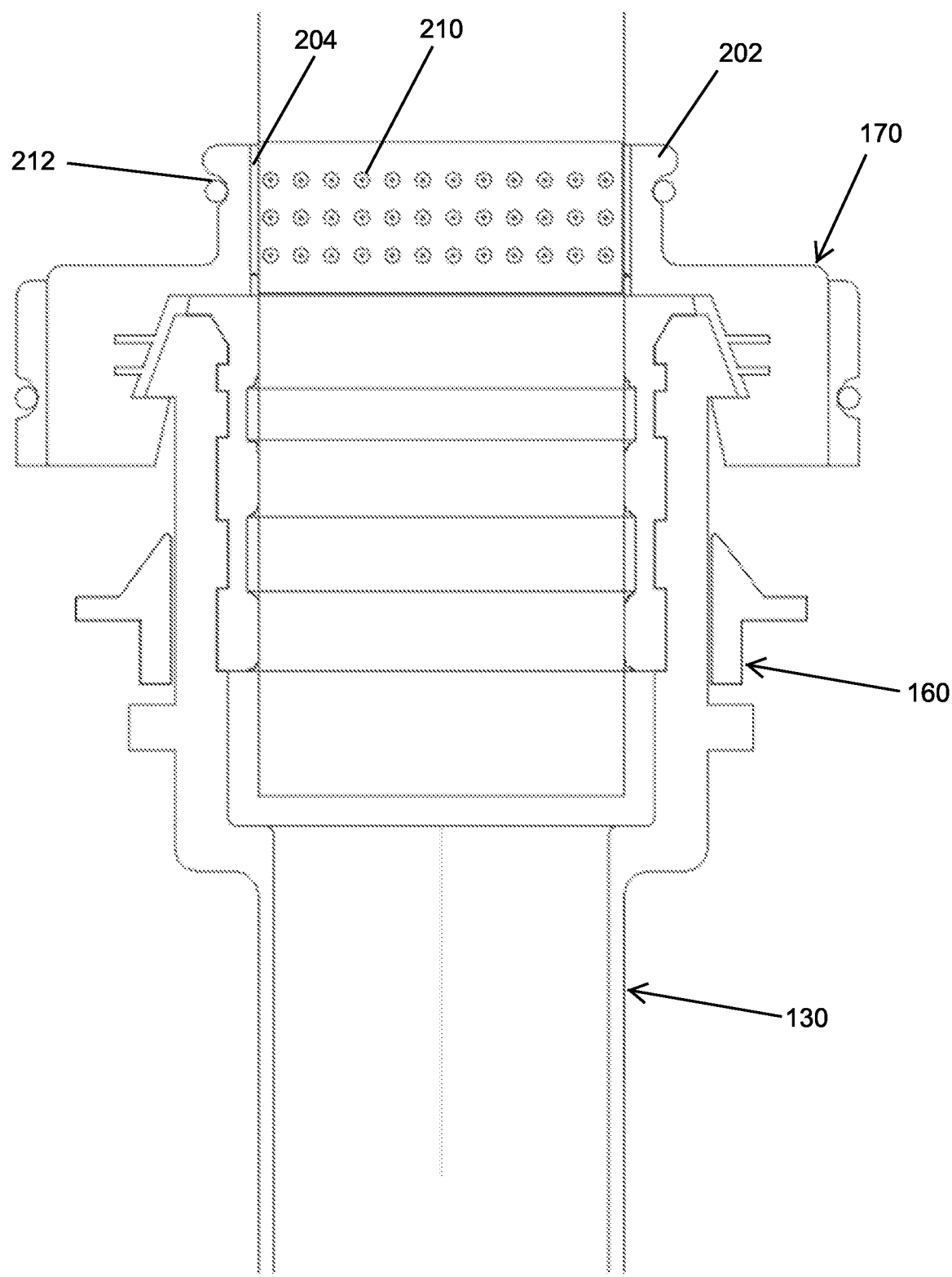
FIG. 12 is a cross-sectional side view of the pipe coupling assembly of FIG. 10, illustrating a snapped-together configuration.
Figure 13:
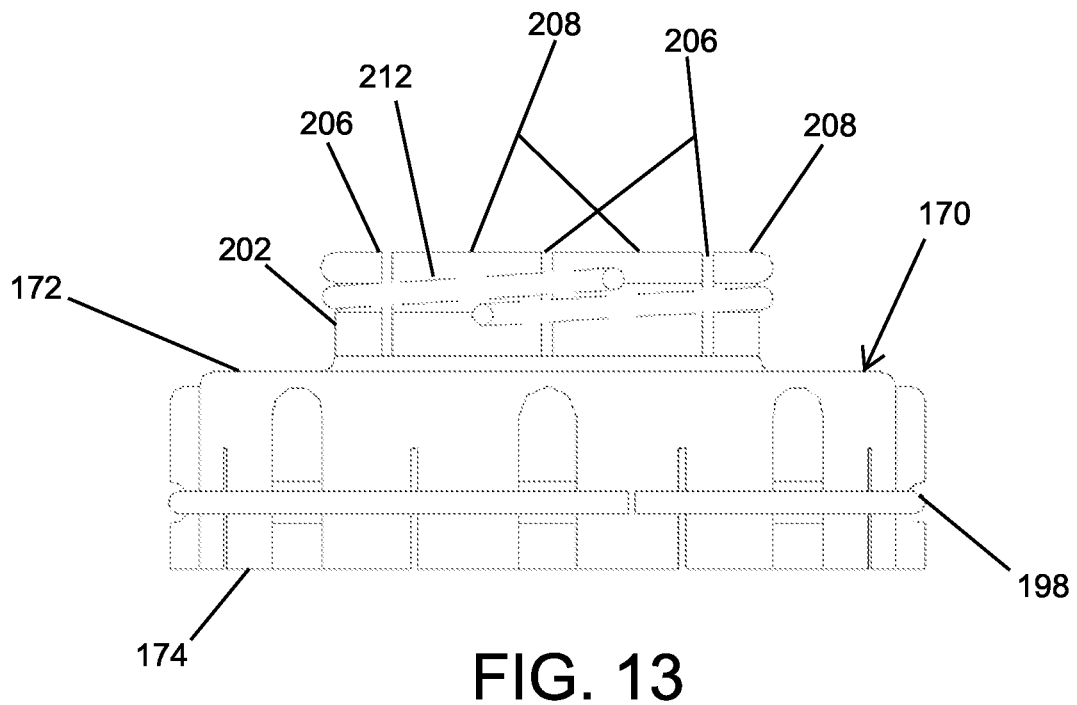
FIG. 13 is a side view of a coupler cap of the pipe coupling assembly of FIG. 10 according to an embodiment of the invention.
Figure 14:
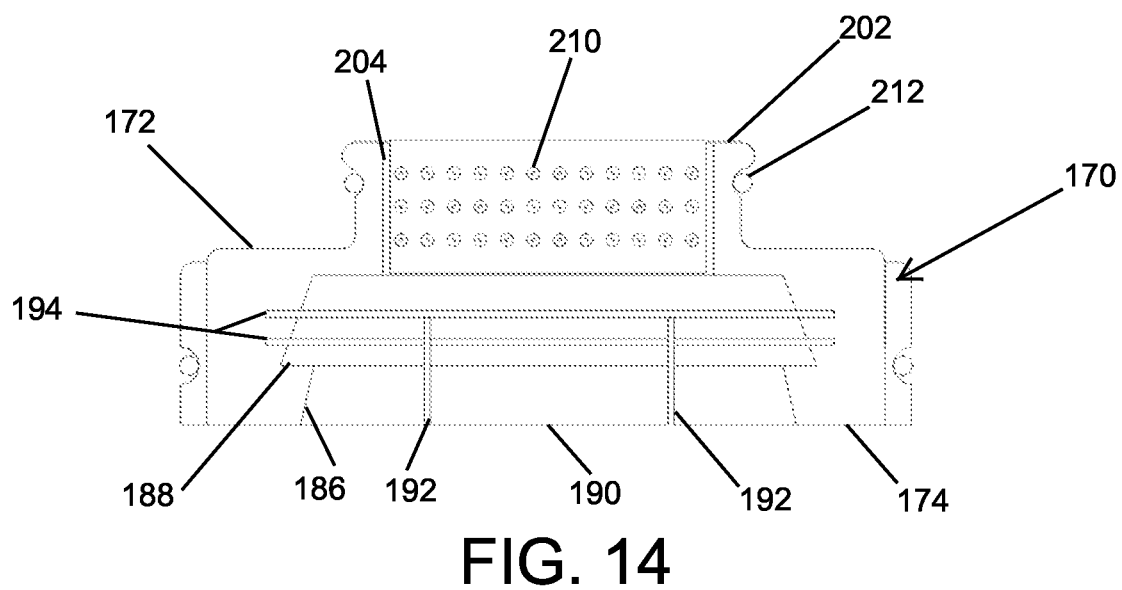
FIG. 14 is a cross-sectional side view of the coupler cap of FIG. 13.

Optionally, the coupler cap 70 may include a plurality of spaced support ribs 100, as illustrated in FIG. 9. The support ribs 100 are disposed on the exterior surface 80 of the coupler cap 70 and can extend fully or partially between first and second sides 72, 74. If the support ribs 100 are disposed under the retaining ring 98, the support ribs 100 can include the annular groove 96 therein. Further optionally, it is contemplated that the support ribs can extend into the sidewall 76 instead of away from the sidewall 76. That is to say that the support ribs would be indented into the sidewall 76. One purpose of either version of support ribs 100 is to provide a surface to facilitate gripping the coupler cap 70, and optionally for added structural support as deemed desirable.

The pipe coupling assembly 20 includes a release ring 60. The release ring 60 is disposed around the exterior surface 36 of the coupler cup 30 and has an exterior surface including an angled surface 62 and a push collar 64. The release ring 60 is substantially in the form of split ring that is capable of being twisted enough to be installed over the upper rim 48 of the coupler cup 30. Further, the coupler cup 30 includes a retainer, such as shoulder 56, on the exterior surface 36 thereof. The shoulder 56 is distal from the upper rim 48 and the release ring 60 is disposed between the upper rim 48 and the shoulder 56. The release ring 60 is movable relative to the coupler cup 30 along the longitudinal axis 46 between the upper rim 48 and the shoulder 56.

Coupler cup 30 and coupler cap 70 include locking elements, such as first engagement surface 52 and second engagement surface 88. Coupler cup 30 includes first engagement surface 52 on the exterior surface 36 thereof that is configured to mate with the second engagement surface 88 formed on the interior surface 78 of coupler cap 70. As illustrated in FIG. 5, second engagement surface 88 and first engagement surface 52 of the coupler cap 70 and coupler cup 30, respectively, are configured such that second engagement surface 88 travels along the angled surface 50 of the coupler cup 30 as coupler cap 70 is pressed down relative to coupler cup 30 when snapping the coupler cap 70 onto the coupler cup 30. The second engagement surface 88 and first engagement surface 52 are configured to draw the coupler cap flange 82 toward the upper rim 48 and gasket rim 54, thereby compressing rim sealing surface 44 between flange 82 and gasket rim 54. When an end portion of a pipe is positioned within coupler cup 30, compression of rim sealing surface 44 between flange 82 and gasket rim 54 can form a liquid-tight seal between coupler cup 30 and the inserted pipe end portion.

During installation (or snapping) the coupler cap 70 to the coupler cup 30, the angled surface 86 of the coupler cap 70 slides along the angled surface 50 of the coupler cup 30 until the second engagement surface 88 overcomes and engages the first engagement surface 52 of the coupler cup 30. The flex tabs 90 and retaining ring 98 of the coupler cap 70 are adapted to flex and expand during installation. Once the second engagement surface 88 has overcome the first engagement surface 52, the flex tabs 90 and retaining ring 98 return to their unexpanded position. The slots 92 and relief grooves 94 in the sidewall 76 enable the flex tabs 90 to flex, substantially pivoting from the first side 72 of the coupler cap 70, and the retaining ring 98 urges the flex tabs 90 to return to their unexpanded position. Additionally, the relief grooves 94 provide an amount of inward flex by compressing the grooves together, providing additional engagement of the coupler cap sidewalls 76 to the coupler cup upper rim 48.

Figure 6:
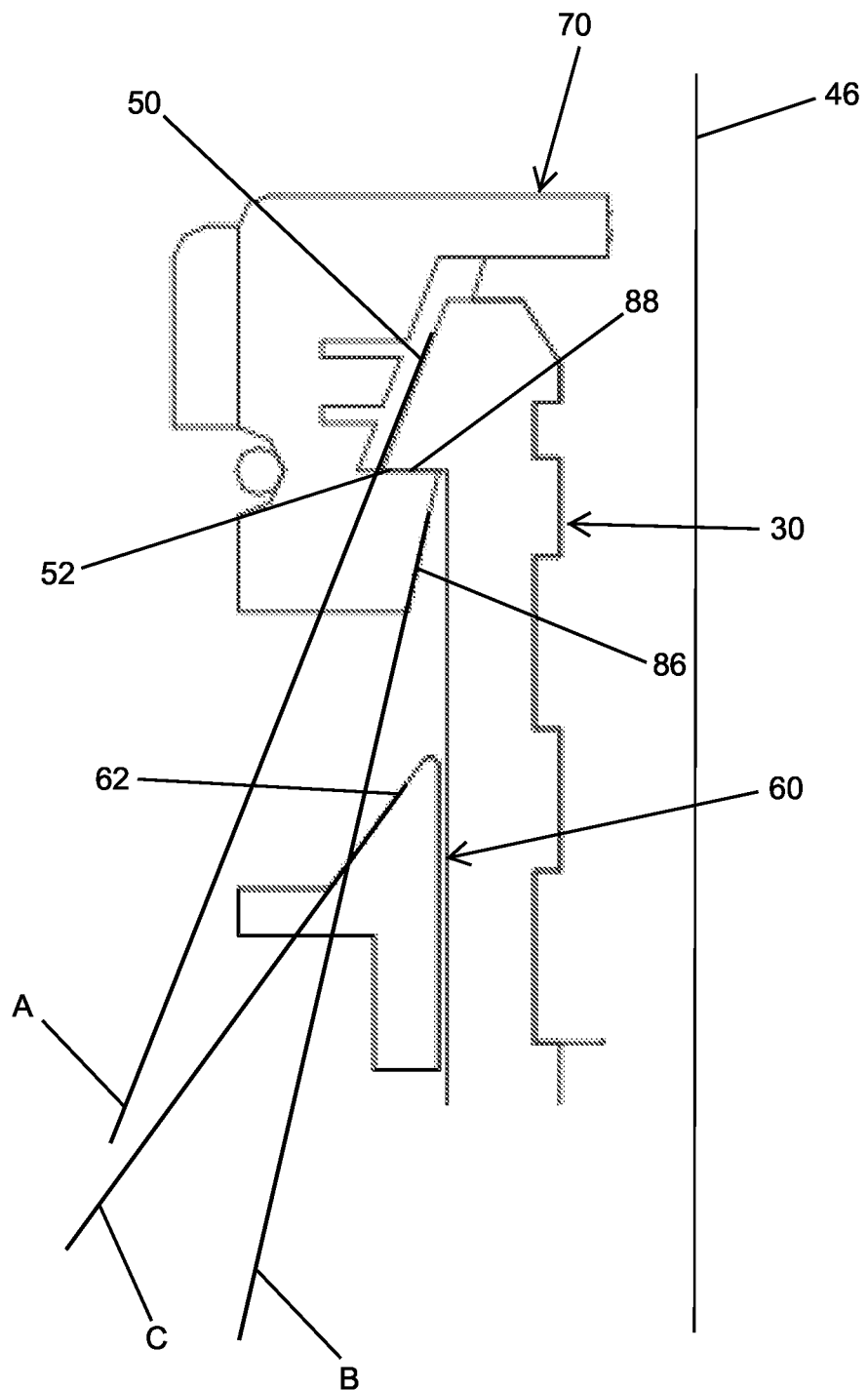
FIG. 6 is a detail view of a portion of the pipe coupling assembly of FIG. 1, illustrating the angles of the angled surfaces.
Figure 7:
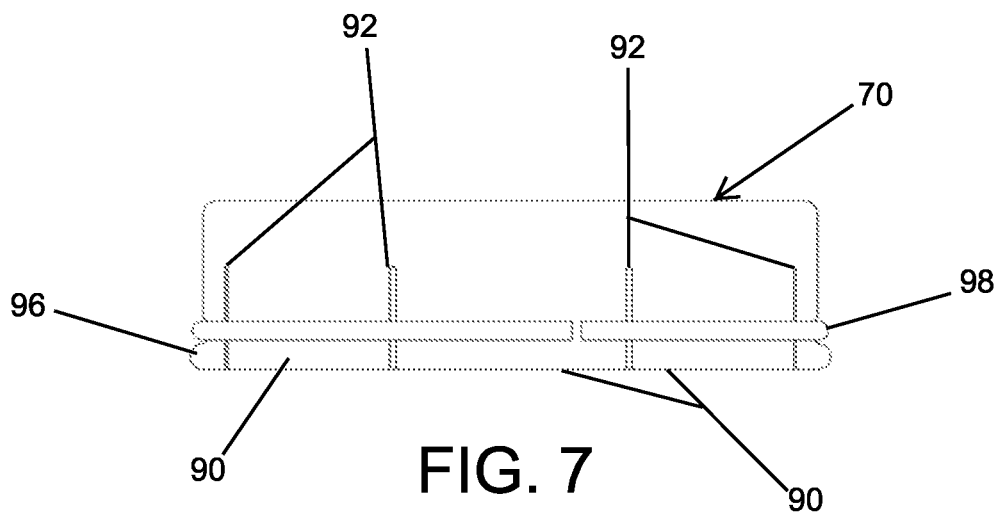
FIG. 7 is a side view of a coupler cap of the pipe coupling assembly according to an embodiment of the invention.
Figure 8:
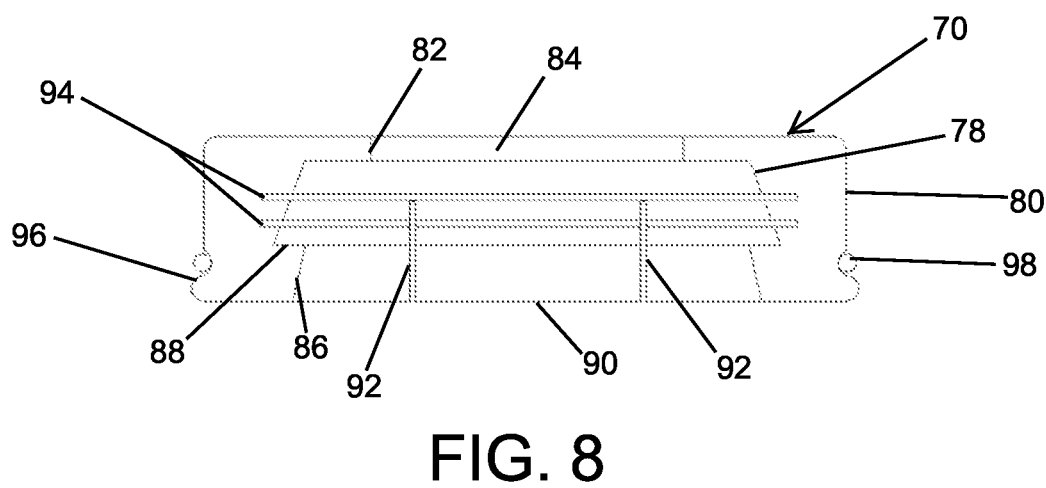
FIG. 8 is a cross-sectional side view of the coupler cap of FIG. 7.

As shown in the detail view of FIG. 6, the angled surface 50 of coupler cup 30 is disposed at a first angle A relative to the longitudinal axis 46 and extends between the upper rim 48 and the first engagement surface 52. The angled surface 86 of the coupler cap 70 is disposed at a second angle B relative to the longitudinal axis 46 and extends between the second side 74 and the second engagement surface 88. The dimensions and location of first engagement surface 52 and second engagement surface 88 are selected based on a desired amount of engagement between the coupler cup 30 and cap 70 to provide a desired amount of locking overlap and rim sealing surface 44 compression. It will be understood that the length and/or angle of angled surfaces 50 and 62 and first and second engagement surfaces 52 and 88 may be selected to allow coupler cap 70 to be installed with a desired amount of installation force and to provide the desired amount of compression. Further, it is contemplated that the first angle A is equal to or greater than the second angle B. Each of the angled surfaces 50 and 86 has a respective length and angle A and B selected to enable the angled surface 86 to slide along angled surface 50 when coupler cap 70 is mounted to coupler cup 30.

The release ring 60 is configured to unlock the locking elements of coupler cup 30 and coupler cap 70. The angled surface 62 of release ring 60 is configured to push against and slide along the angled surface 86 of the coupler cap 70 to expand the flex tabs 90 outward. The release ring 60 and coupler cap 70 are configured such that the angled surface 62 travels along the angled surface 86 of the coupler cap 70 as the release ring 60 is pressed against the coupler cap 70 to disengage the coupler cap 70 from the coupler cup 30. The angled surface 62 pressing against the angled surface 86 causes the flex tabs 90 to flex away from the longitudinal axis 46 until second engagement surface 88 disengages from first engagement surface 52 and the coupler cap 70 is free for removal. Due to the compressed rim sealing surface 44, which is compressed during installation of the coupler cap 70 to the coupler cup 30, once the second engagement surface 88 and first engagement surface 52 are disengaged, the rim sealing surface 44 aids in popping the coupler cap 70 up from the coupler cup 30.

The angled surface 62 of the release ring 60 is disposed at a third angle C relative to the longitudinal axis 46. The angled surface 62 has a length and angle C selected to provide the desired amount of flex and expansion of the coupler cap flex tabs 90 to remove the coupler cap 70 from the coupler cup 30. Third angle C is greater than second angle B of the coupler cap 30. The relative dimension of angles B and C is selected such that the angled surface 62 of release ring 60 pushes the angled surface 86 of the coupler cap 70 a sufficient amount to result in the disengagement of the second engagement surface 88 and first engagement surface 52. During removal, the retaining ring 98 expands and the slots 92 and relief grooves 94 in the sidewall 76 enable the flex tabs 90 to flex, substantially pivoting from the first side 72 of the coupler cap 70 away from the longitudinal axis 46. Further, the release ring 60 can include a push collar 64 to provide a greater surface area for which a user can press against during removal of the coupler cap 70.

The components of coupler cup 30 and coupler cap 70 are selected to provide the desired amount of sealing surface compression based on the intended use of pipe coupling assembly 20. The dimensions and arrangement of the angled surfaces 50, 86, first engagement surface 52, and second engagement surface 88 are selected to provide the desired amount of sealing surface compression when coupler cap 70 is in the installed condition. The dimensions of coupler cup 30 and body sealing surfaces 40, 42 can also be selected to provide the desired amount of sealing surface compression when the end portion of first pipe 22 is inserted into coupler cup 30 to form a liquid-tight seal. In addition, the materials forming rim sealing surface 44 and body sealing surfaces 40, 42 are selected based on the amount of compression desired when coupler cup 30 and coupler cap 70 are coupled. The combination of radial and axial compression of the gasket sleeve 38 against the coupler cup 30 contributes to forming the liquid-tight seal around the end portion of first pipe 22. It will be understood that first pipe 22, coupler cup 30, and coupler cap 70 may be configured to provide different amounts of radial and/or axial compression of rim sealing surface 44 and body sealing surfaces 40, 42 to provide the desired degree of sealing.

Although illustrated as connecting two straight pipes, pipe coupling assembly 20 can be used on any type of pipe, non-limiting examples of which include a liquid trap, a T-shaped pipe, and a cross-over pipe. Pipe coupling assembly 20 can be used with any pipe end portion having an uninterrupted exterior surface, i.e. no special features are required on the inserted pipe end portion for use with pipe coupling assembly 20 and thus pipe coupling assembly 20 can essentially be used with any pipe end portion to form a liquid-tight seal. For example, because pipe coupling assembly 20 does not require the inserted pipe portion to have any particular exterior features for coupling, the dimensions of coupler cup 30 can be configured for use with any existing pipe having an end portion having a straight section long enough to fit within coupler cup 30 and engage both body sealing surfaces 40, 42. Coupler cup 30 and gasket sleeve 38 can have dimensions customized to receive a pipe end portion of a particular dimension or dimensions corresponding to commonly used pipe dimensions. For example, the dimensions of coupler cup 30 and gasket sleeve 38 can be configured to seal with pipes typically used in under-sink drain systems. Pipe coupling assembly 20 also facilitates designing kits for sale that are interchangeable. Regardless of what type of connecting pipe is being used—drain basket, T-shaped, liquid trap, etc. . . . —as long as the connecting pipe includes an end portion having a straight section with dimensions configured to be received within coupler cup 30 and compress body sealing surfaces 40, 42 and to seal with rim sealing surface 44 when coupler cap 70 is in the installed position, pipe coupling assembly 20 can be used.

Further, the multiple body sealing surfaces 40, 42 inside coupler cup 30 facilitate holding the inserted pipe end portion parallel within coupler cup 30 and also create multiple seals within coupler cup 30 that contribute to forming a liquid-tight seal. Compression of rim sealing surface 44 forms a third seal around the inserted pipe end portion, further contributing to formation of a liquid-tight seal. The multiple body sealing surfaces 40, 42 help to hold and stabilize the inserted pipe end portion relative to coupler cup 30, which can contribute to forming the liquid-tight seal. The design of pipe coupling assembly 20 is easy to use and incorporate across multiple different types of pipe configurations. In addition, coupler cap 70, which is designed to provide the correct amount of sealing compression to rim sealing surface 44, makes pipe coupling assembly 20 "user-friendly" for consumers. Coupler cap 70 removes the guesswork for consumers compared to other systems that utilize a traditional threaded cap for tightening the connection in which it is unclear whether the cap has been tightened enough or not enough. Coupler cap 70 is configured to simply snap into place to provide the correct amount of sealing surface compression when snapped onto the coupler cup 30.

Referring now to FIGS. 10-14, the numeral 120 designates another embodiment of a coupling assembly. Similar to coupling assembly 20, coupling assembly 120 includes a coupler cup 130 and coupler cap 170 similar to those described above. Coupler cup 130 is formed on an end portion of second pipe 124, for coupling to an end portion of an adjacent pipe 122. Gasket sleeve 138 includes at least two annular sealing surfaces 140, 142 on an interior surface of the gasket sleeve 138. The coupler cup 130 includes upper rim 148 defining an opening into the interior of the coupler cup 130 through which a pipe 122 may be inserted. An annular rim sealing surface 144 is provided on upper rim 148 for forming a liquid-tight seal between the coupler cup 130, coupler cap 170, and the first pipe 122.

In the illustrated embodiment, the coupler cap 170 includes a cinch collar 202 extending up from a first side 172 of the coupler cap 170. The cinch collar 202 defines an opening 204 through which an end of the first pipe 122 may be inserted. The cinch collar 202 includes a plurality of space slots 206 configured to form a plurality of cinch tabs 208 configured to flex inwardly. The cinch collar 202 and cinch tabs 208 are adapted to engage the first pipe 122. A bonding sleeve 210 may be disposed between the cinch collar 202 and the first pipe 122 to bond the coupler cap 170 to the pipe 122. The bonding sleeve 210 may include impregnated spiked prongs on both an interior surface and an exterior surface thereof. Further, a pinch ring 212 may be installed around an exterior surface of the cinch collar 202 to provide additional coupling force to engage the cinch collar 202 to the pipe 122.

Coupling assembly 120 provides a pressure tight connection for adjoining adjacent pipes used to transport pressurized fluid. Utilizing the cinch collar 202, bonding sleeve 210, and pinch ring 212 substantially permanently bond the coupler cap 170 to the first pipe 122. Accordingly, when removing the coupler cap 170 from engagement with the coupler cup 130, as described above, the first pipe 122 is removed along with the coupler cap 170. Of course, it should be understood that coupling assembly 120 could be utilized for non-pressurized fluid transportation as well.

Accordingly, the pipe coupling assemblies described herein provide a quick and easy snap-together coupling apparatus to sealingly join adjacent pipes. Additionally, the removal tool, a.k.a. the release ring, is included on the coupling assembly and is therefore always available for use when a user wishes to disconnect the pipes. In this way, the removal tool is never lost. The pipe coupling assemblies also include multiple sealing surfaces that seal against an outside surface of an end portion of a pipe inserted into the pipe coupling assembly. The coupler cup and coupler cap are also sealingly connected.

Embodiment 1 relates to a pipe coupling assembly comprising:
a coupler cup comprising:
a main body portion including an exterior surface and an interior surface defining an interior of the coupler cup;
an upper rim defining an opening into the interior of the coupler cup;
a first engagement surface disposed on the exterior surface of the main body portion;
a rim sealing surface surrounding the upper rim, the rim sealing surface adapted to form a liquid-tight seal; and
at least one body sealing surface disposed in the interior of the coupler cup and adapted to form a liquid-tight seal; and
a coupler cap adapted snap onto the coupler cup, the coupler cap comprising a central opening and an annular sidewall having an interior surface and an exterior surface, the interior surface including a second engagement surface adapted to engage the first engagement surface when the coupler cap is snapped onto the coupler cup, the coupler cap adapted to engage and compress the rim sealing surface when the coupler cap is snapped onto the coupler cup, wherein the compressed rim sealing surface and the at least one body sealing surface provide at least two liquid-tight seals around an end portion of a pipe inserted into the coupler cup.

Embodiment 2 relates to the pipe coupling assembly of embodiment 1, comprising a release ring disposed around an exterior of the coupler cup, the release ring including an exterior surface including an angled surface and configured to disengage the coupler cap second engagement surface from the coupler cup first engagement surface when moved toward the coupler cap.

Embodiment 3 relates to the pipe coupling assembly of embodiment 2, the coupler cup defining a longitudinal axis and including a retainer, wherein the retainer is a shoulder on the exterior surface thereof, the shoulder being distal from the upper rim, wherein the release ring is disposed between the upper rim and the shoulder and is movable relative to the coupler cup along the longitudinal axis.

Embodiment 4 relates to the pipe coupling assembly of any one of embodiments 1-3, the coupler cup including an angled surface on the exterior thereof and between the upper rim and the first engagement surface, and the coupler cap including a first side, a second side, and an angled surface on the interior thereof, the angled surface extending between the second side and the second engagement surface.

Embodiment 5 relates to the pipe coupling assembly of embodiment 4, the coupler cap including a plurality of flex tabs defined by a plurality of spaced slots in the sidewall and extending from the second side of the coupler cap.

Embodiment 6 relates to the pipe coupling assembly of embodiment 5, wherein when snapping the coupler cap onto the coupler cup, the angled surface of the coupler cap slides along the angled surface of the coupler cup until the second engagement surface engages the first engagement surface of the coupler cup, wherein the flex tabs are adapted to flex outwardly during the snapping.

Embodiment 7 relates to the pipe coupling assembly of any one of embodiments 1-6 comprising a release ring disposed around the exterior of the coupler cup, the release ring including an exterior surface including an angled surface.

Embodiment 8 relates to the pipe coupling assembly of embodiment 7, the coupler cup defining a longitudinal axis defining a longitudinal axis, the angled surface of the coupler cup disposed at a first angle relative to the longitudinal axis and the angled surface of the coupler cap disposed at a second angle relative to the longitudinal axis.

Embodiment 9 relates to the pipe coupling assembly of embodiment 8, wherein the first angle is equal to or greater than the second angle.

Embodiment 10 relates to the pipe coupling assembly of embodiments 8 or 9, wherein the angled surface of the release ring is disposed at a third angle relative to the longitudinal axis, and the third angle is greater than the second angle.

Embodiment 11 relates to the pipe coupling assembly of embodiment 10, wherein when removing the coupler cap from the coupler cup, the release ring pushes against and slides along the angled surface of the coupler cap to flex the flex tabs outwardly until the second engagement surface disengages from the coupler cup first engagement surface and the coupler cap is free for removal.

Embodiment 12 relates to the pipe coupling assembly any one of embodiments 6-11 comprising a retaining ring, the retaining ring disposed on the exterior surface of the coupler cap to retain the coupler cap on the coupler cup.

Embodiment 13 relates to the pipe coupling assembly of embodiment 12, wherein the coupler cap includes an annular groove on the exterior surface thereof and the retaining ring is disposed in the annular groove.

Embodiment 14 relates to the pipe coupling assembly of any of the previous embodiments wherein when removing the coupler nut from the coupler cup, the angled surface of the release ring pushes against and slides along the angled surface of the coupler nut to expand the flex tabs until the second engagement surface disengages the coupler cup first engagement surface and the coupler nut is free for removal.

Embodiment 15 relates to the pipe coupling assembly of any of the previous embodiments, comprising a retention coil, the retention coil disposed on the exterior surface of the coupler nut to retain the coupler nut to the coupler cup.

Embodiment 16 relates to the pipe coupling assembly of embodiment 15, wherein the coupler nut includes an annular groove on the exterior surface thereof and the retention coil is disposed in the annular groove.

Embodiment 17 relates to the pipe coupling assembly of any of the previous embodiments, comprising a gasket sleeve including a rim sealing surface surrounding the upper rim of the coupler cup and at least one body sealing surface disposed in the interior surface of the coupler cup, the rim sealing surface and at least one body sealing surface adapted to form liquid-tight seals.

Embodiment 18 relates to the pipe coupling assembly of embodiment 17, wherein the coupler nut is adapted to engage and compress the rim sealing surface when the coupler nut is mounted to the coupler cup and the compressed rim sealing surface and the at least one body sealing surface provide at least two liquid-tight seals around an end portion of a pipe inserted into the coupler cup.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What I claim is:

1. A pipe system for connecting adjacent pipes comprising:
   a first pipe having a coupler cup formed in an end thereof, the coupler cup including a first engagement surface on an exterior surface thereof, the coupler cup configured for receiving an end of a second pipe therein;
   a coupler cap defining an interior surface and an exterior surface and comprising a second engagement surface on the interior surface, the coupler cap configured and arranged to have a snap fit connection with the coupler cup, the coupler cap disposed around the exterior surface of the coupler cup and having a central opening for receiving the second pipe therethrough; and
   a release ring disposed around the exterior surface of the coupler cup and beneath the coupler cap,
   wherein the second engagement surface is adapted to engage the first engagement surface when the coupler cap is snapped onto the coupler cup, and the release ring configured to disengage the second engagement surface from the first engagement surface when moved toward the coupler cap to remove the coupler cap from the coupler cup.

2. The pipe system of claim 1, the coupler cap including a sidewall and a plurality of flex tabs defined by a plurality of spaced slots in the sidewall, the flex tabs configured to flex outwardly.

3. The pipe system of claim 2, the exterior surface of the coupler cup including an angled surface, the interior surface of the coupler cap including an angled surface, and the exterior surface of the release ring including an angled surface,
   wherein when snapping the coupler cap onto the coupler cup, the flex tabs flex outwardly as the angled surface of the coupler cap slides along the angled surface of the coupler cup until the second engagement surface engages the first engagement surface.

4. The pipe system of claim 3, the coupler cup defining a longitudinal axis,
   wherein the angled surface of the coupler cup is disposed at a first angle relative to the longitudinal axis and the angled surface of the coupler cap is disposed at a second angle relative to the longitudinal axis, and the first angle is equal to or greater than the second angle.

5. The pipe system of claim 4, wherein the angled surface of the release ring is disposed at a third angle relative to the longitudinal axis, and the third angle is greater than the second angle.

6. The pipe system of claim 5, further comprising a seal disposed within the coupler cup and extending between the coupler cup and the coupler cap.

7. The pipe system of claim 1, the coupler cap including a cinch collar defining an opening adapted to receive the end of the second pipe, the cinch collar adapted to engage the second pipe.

8. The pipe system of claim 7, further comprising a bonding sleeve configured to be disposed between the cinch collar and the second pipe and a pinch ring disposed around the cinch collar, the bonding sleeve configured to bond the coupler cap to the second pipe.

9. A pipe coupling assembly comprising:
   a coupler cup defining an interior and an exterior, the coupler cup comprising:
      a main body portion including an upper rim defining an opening into the interior of the coupler cup; and
      a first engagement surface and an angled surface on the exterior of the coupler cup;
   a release ring disposed around the exterior of the coupler cup, the release ring including an angled surface on an exterior surface thereof; and
   a coupler cap adapted to be snapped onto the coupler cup, the coupler cap comprising:
      a sidewall having an interior surface and an exterior surface; and
      a second engagement surface and an angled surface on the interior surface of the sidewall;
   wherein the second engagement surface is adapted to engage the first engagement surface when the coupler cap is snapped to the coupler cup, the angled surface of the coupler cap slides along the angled surface of the coupler cup until the second engagement surface engages the first engagement surface of the coupler cup.

10. The pipe coupling assembly of claim 9, the coupler cap including a plurality of flex tabs defined by a plurality of spaced slots in the sidewall of the coupler cap, the flex tabs configured to flex outwardly.

11. The pipe coupling assembly of claim 10, wherein when removing the coupler cap from the coupler cup, the angled surface of the release ring pushes against and slides along the angled surface of the coupler cap to flex the flex tabs outwardly until the second engagement surface disengages the first engagement surface and the coupler cap is free for removal.

12. The pipe coupling assembly of claim 9, further comprising a gasket sleeve including a rim sealing surface surrounding the upper rim of the coupler cup and at least one body sealing surface disposed in the interior of the coupler cup, the rim sealing surface and the at least one body sealing surface adapted to form liquid-tight seals.

13. The pipe coupling assembly of claim 9, further comprising a cinch collar defining a central opening adapted to receive an end portion of a pipe, the cinch collar adapted to engage the pipe.

14. The pipe coupling assembly of claim 13, further comprising a retaining ring, the retaining ring disposed on the exterior of the coupler cap to retain the coupler cap on the coupler cup,
wherein the coupler cap includes an annular groove on the exterior surface of the sidewall and the retaining ring is disposed in the annular groove.

15. A coupler cap for coupling first and second pipes together, the coupler cap comprising:
a sidewall having an interior surface, an exterior surface, and opposed ends defining a first side and a second side;
a central opening through the first side for receiving an end of the first pipe therethrough;
a central opening on the second side for receiving an end of the second pipe therethrough;
an engagement surface on the interior surface of the sidewall forming a snap fit coupler for engaging the second pipe;
an angled surface on the interior surface of the sidewall, the angled surface extending between the second side thereof and the engagement surface and guiding the second pipe into engagement with the engagement surface;
the sidewall having a plurality of spaced slots defining a plurality of flex tabs configured to flex outwardly; and
a retaining ring,
wherein the coupler cap includes an annular groove on the exterior surface of the sidewall and the retaining ring is disposed in the annular groove to retain the coupler cap to the second pipe.

16. The coupler cap of claim 15, further comprising a cinch collar extending from the first side and axially aligned with the central opening for receiving the end of the first pipe therethrough, the cinch collar adapted to engage the first pipe.

17. The coupler cap of claim 16, further comprising a bonding sleeve disposed between the cinch collar and the first pipe and a pinch ring disposed around the cinch collar, the bonding sleeve configured to bond the coupler cap to the first pipe.

18. The coupler cap of claim 15, wherein the of annual groove increases flexibility of the flex tabs.

19. The coupler cap of claim 15, wherein when snapping the coupler cap onto the second pipe, the flex tabs flex outwardly as the angled surface slides along the second pipe until the engagement surface engages the second pipe, after which the flex tabs return to their unflexed state.

* * * * *